United States Patent Office 3,354,041
Patented Nov. 21, 1967

3,354,041
NUCLEAR REACTOR REFUELLING DEVICE
Michel Aubert, Fontenay-aux-Roses, Daniel Brouard, Clamart, and Pierre Rouge, Orsay, France, assignors to Commissariat à l'Energie Atomique, Paris, France
Filed Nov. 1, 1965, Ser. No. 505,886
Claims priority, application France, Nov. 18, 1964, 995,388
3 Claims. (Cl. 176—30)

ABSTRACT OF THE DISCLOSURE

A gas cooled reactor is mounted in a containment shield enclosing a garret. A refuelling device in the garret includes a storage system and a handling system for fuel element magazines for placing and replacing fuel elements in the channels. A system is also provided for supplying to and removing fuel element magazines from the garret including a lock chamber and a door for the lock chamber.

---

This invention relates to an improvement to the nuclear reactor refuelling device of the type described in United States Patent No. 3,196,803 as applicable in particular to nuclear reactors which make use of graphite moderator and a coolant gas such as carbon dioxide.

The refuelling device referred to is designed for gas-cooled reactors of the type comprising a moderator structure which is pierced by channels for accommodating fuel elements and a "garret" which is formed within the reactor containment shielding, the said garret being separated from the reactor-core vault by a wall pierced by pluggable openings which provide access to said channels. Said refuelling device comprises a storage system disposed within the garret, a handling system whereby fuel element magazines can be taken from and deposited in the storage system and fresh fuel elements can be exchanged for spent elements contained in a fuel channel, and a system for inserting fuel element magazines into the garret and transferring them to the storage system, and for withdrawing said magazines from said storage system and conveying them outside of the garret.

The present invention relates more specifically to one form of embodiment of this particular device as described in United States Patent No. 3,196,803 wherein the insertion and withdrawal system is disposed within a tunnel which traverses the reactor containment structure and which is provided with a lock-chamber.

In the example described in this patent a concrete structure which surrounds the tunnel forms a radial extension of the reactor vessel and provides biological shielding during the withdrawal of irradiated fuel elements. The lock-chamber is opened and closed by means of two doors each consisting of a flap having the shape of a spherical cap which is adapted to move within a spherical housing about pivot-shafts which are perpendicular to the axis of the tunnel. Each door can thus be brought opposite a stationary circular seating and can then be applied against this latter by means of jacks.

A manhole is provided at the level of each spherical housing in order to permit of any subsequent repairs to the doors. The concrete structure comprises removable slabs which are located opposite to each manhole so as to provide direct access both to the doors and to the tunnel.

The reactor vessel is usually constructed of prestressed concrete which is lined with a leak-tight membrane, the design function of the concrete being to provide both biological shielding and resistance to coolant gas pressure. The tunnels for insertion and withdrawal of the fuel elements form on said reactor vessel projecting steel elements of substantial length.

The safety afforded by prestressed concrete is therefore reduced to a considerable extent since any crack formation in the steel is liable to result in rapid draining of the installation. Furthermore, both the weight and bulk of lock-chambers and doors are very substantial when they are fitted with biological shielding.

The present invention makes it possible to overcome the above-noted disadvantages by dispensing with said projecting steel elements or at least by reducing these latter to an appreciable extent, the result thereby achieved being to increase the safety of the installation while at the same time reducing its overall bulk to a substantial degree.

To this end, the invention proposes a refuelling device of the type hereinabove defined, wherein the system of insertion and withdrawal of fuel element magazines is disposed within a lock-chamber which forms a radial extension to the garret of the reactor and which is located within the thickness of the reactor containment shielding, the orifice which provides access from the garret to the lock-chamber being obturable by means of a door which is movable within said garret.

The other lock-chamber door provides access to an elevator and can be identical with those described in United States Patent No. 3,196,803. However, in accordance with a secondary feature of the device, the door-flaps are so shaped as to permit the introduction of these latter within either the lock-chamber or the garret without entailing the need to open any means of access other than those provided for the normal utilization of the garret. Provision need therefore no longer be made for a manhole.

In accordance with one of the preferred forms of embodiment of the device, the displacement of a door-flap for the purpose of freeing the orifice of the corresponding lock-chamber is carried out by means of a movement of rotation of said flap about a stationary vertical pivot, said movement of rotation being controlled from the exterior of the reactor vessel. When the flap is in position opposite the lock-chamber orifice, a movement of translation performed at right angles to its plane makes it possible to apply the flap against a seating which has the same configuration and which is formed at the end of said lock-chamber. The movement of translation referred to can be effected by means of a jack, the action of which subsequently ensures leak-tight closure.

In accordance with another form of embodiment which is particularly advantageous when high pressure is maintained within the garret, the orifice of the lock-chamber which provides access to the garret can also be freed by means of a horizontal movement of translation of the door which is located inside said garret.

The description which follows below in reference to FIGS. 1 to 5 of the accompanying drawings relates to particular forms of embodiment of the device in accordance with the invention, as contemplated in the patent of addition, which have been chosen by way of example and not in any sense by way of limitation.

Figure 1:
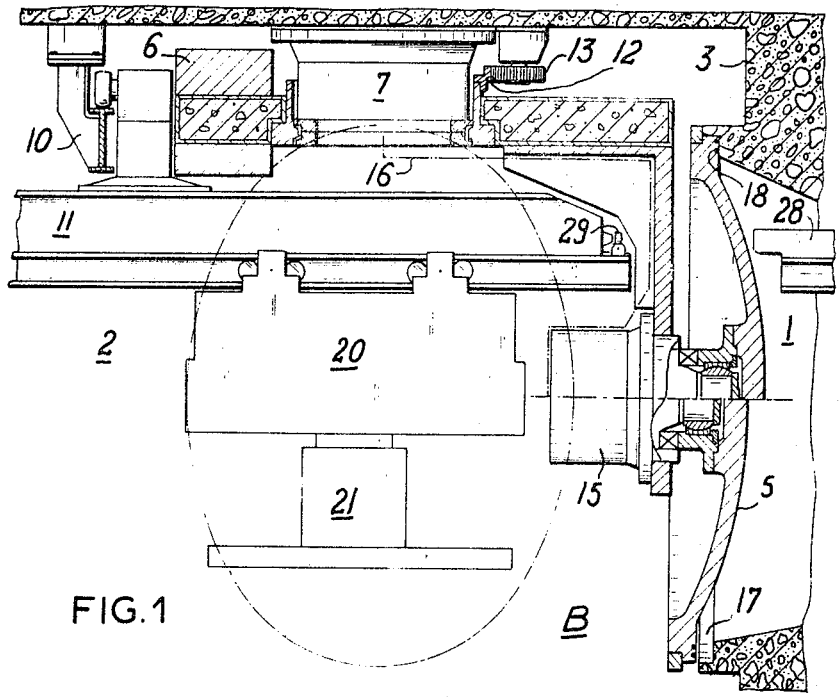
FIG. 1 is a vertical sectional view of a door which provides communication between the lock-chamber and the reactor garret, the door-flap being shown in the closed position.

The lock-chamber 1 of FIG. 1 is interposed between the garret 2 of a pressurized-gas-cooled reactor of the same type as that which is described in United States Patent No. 3,196,802 and an elevator which is not shown in the drawings and by means of which the magazines containing fresh or spent fuel elements are either supplied or withdrawn. Said lock-chamber is formed in the thickness of the prestressed concrete vessel 3 which provides the reactor with biological shielding and constitutes a pressure-resistant shell.

The door 4 for sealing the lock-chamber 1 on the side facing the garret 2 is located above the storage zone B of the periphery of the garret 2 but inside this latter.

Figure 2:
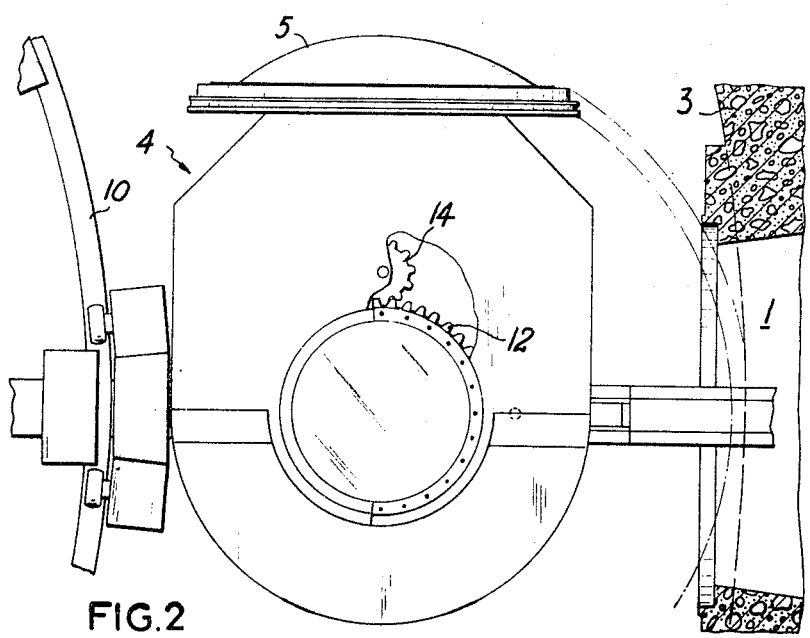
FIG. 2 is an overhead view of the door which is illustrated in FIG. 1, the flap being shown in the open position.
Figure 3:
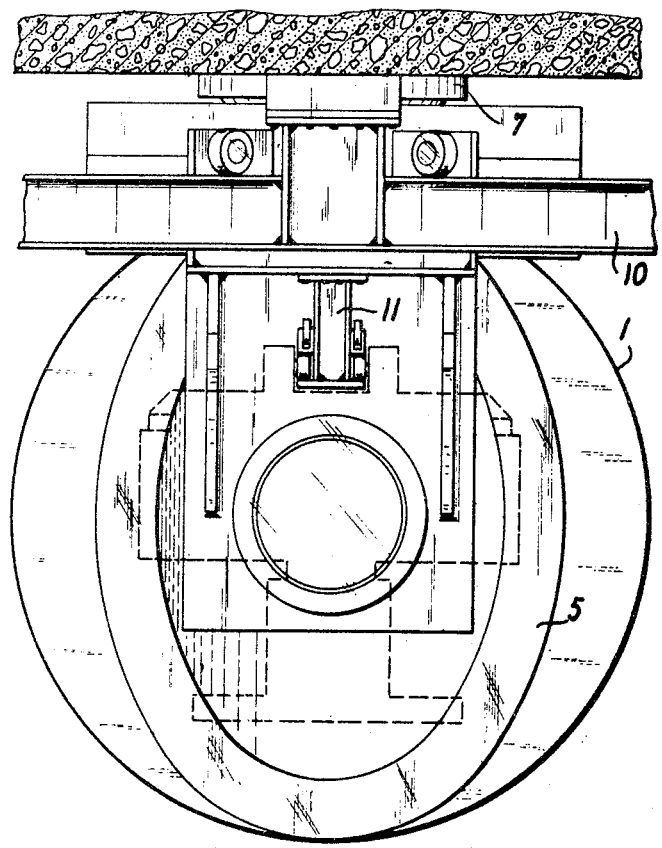
FIG. 3 is a left-hand view of the door which is illustrated in FIG. 1, the flap being shown in the closed position.

As shown in FIGS. 1 to 3, the door 4 essentially consists of a flap 5 and a counterpoise 6, the complete assembly being rotatable about a vertical pivot 7. Said pivot is secured to the top wall of the garret 2 between the circular roller track 10 of the charging arm 11 and the periphery of the garret.

As appears in particular from FIG. 3, the flap 5 has the shape of an ellipse, the short axis of which is smaller than the diameter of the lock-chamber, in order that said flap can be introduced in the garret or be withdrawn therefrom through the lock-chamber, should the need arise. With the same object in view, the flap can also have a rectangular shape.

The movements of rotation of the door about the pivot 7 are controlled by means of a toothed wheel 12 which is integral with the door and geared with a pinion 13 which is actuated from outside of the garret. Provision is also made for a stand-by door-rotating system 14. In addition, the door is fitted with a jack 15 which is supplied through the ducts 16 and serves to displace the flap 5 with respect to the door as a whole.

In the open position, the flap 5 is located in a position such as to be placed parallel to the axis of the lock-chamber (as shown in FIG. 2), thus freeing the entrance to this latter. A movement of rotation through an angle of 90° brings the flap 5 into a transverse position with respect to the lock-chamber 1 (as shown in FIGS. 1 and 3) and opposite to an elliptic seating 17 disposed at the extremity of the cylindrical lock-chamber 1. The flap is then applied against said seating as a result of the action of the jack 15, leak-tightness being ensured by the compression of seals 18.

The charging machine 20 which is suspended from the charging arm 11 and which carries a fuel element magazine 21 has been shown diagrammatically in the figures in such a manner as to show the overall size of these units with respect to the door and lock-chamber.

The drawings also show the monorail track section 28 from which the charging machines 20 are suspended when they are located within the lock-chamber. Said monorail track section can be displaced longitudinally in such a manner as to ensure continuity with the arm 11 or with the monorail track which leads to the elevator when the corresponding doors are open. A safety device 29 (as shown in FIG. 1) prevents the charging machines 20 from leaving the arm 11 before the continuity referred-to has been established.

The second lock-chamber door which provides access to the elevator has not been shown in the figures, but comprises a movable flap which is similar to that of the door 4. Said flap is adapted to pivot within a spherical housing formed by an extension of the leak-tight metallic lining of the lock-chamber.

Said spherical metallic housing can have a thickness which is sufficient to withstand the stresses produced by the pressure. The housing can also be of smaller thickness in order to provide leak-tightness alone but, in that case, should preferably be encased in a pressure-resistant jacket of prestressed concrete which is fixed to the reactor vessel 3. However, even in this contingency, the arrangement of the door 4 within the garret of the reactor and the arrangement of the lock-chamber 1 inside the reactor containment shielding 3 is advantageous in that it dispenses with the need of a long tunnel outside the reactor vessel and of the bulky shield structure which such a tunnel entails.

Figure 4:
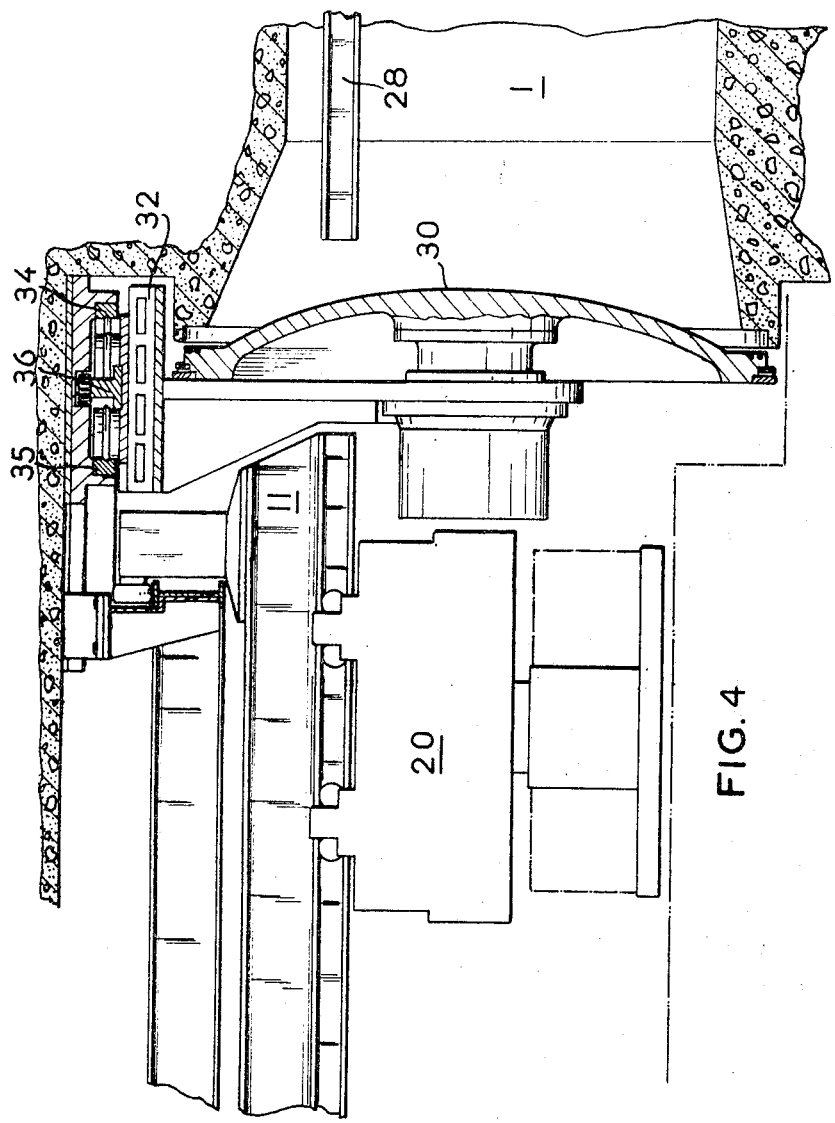
FIG. 4 is a vertical sectional view which illustrates another form of embodiment of the door for providing communication between the lock-chamber and the garret.
Figure 5:
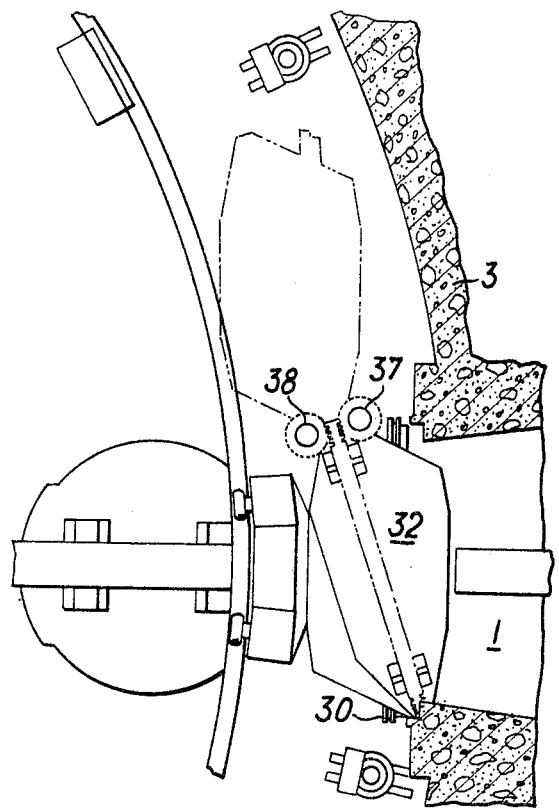
FIG. 5 represents an overhead view of the door of FIG. 4 and shows the two end positions of the flap.

FIGS. 4 and 5 relate to another form of embodiment of the device which retains the same advantages. The door of the lock-chamber 1 which communicates with the garret has a flap 30 of oval shape which is similar to the flap shown in FIGS. 1 to 3. Said flap is suspended from a support plate 32 carried by the top wall of the garret. Said support plate 32 can be displaced in a horizontal movement of translation, drawing with it the flap 30 so as to free the lock-chamber orifice completely, thus taking up the position shown in chain-dotted lines in FIG. 5. The movements of the plate 32 are guided by means of two rails 34, 35 and produced by means of a double rack 36 which is integral with the support plate 32 and which engages with two driving pinions 37, 38, one of which is normally disengaged and provided as a stand-by. These pinions are actuated from the exterior of the garret.

What we claim is:

1. Refuelling device for gas-cooled nuclear reactors of the type comprising a moderator structure through which are formed channels designed to receive fuel elements, and a "garret" provided within the reactor containment shielding and separated from the vault which contains the reactor core by a wall pierced by pluggable openings which provide access to said fuel channels, wherein said device comprises a storage system disposed within said garret, a handling system whereby fuel element magazines can be taken from and deposited in the storage system and fresh fuel elements can be exchanged for spent elements contained in a fuel channel, and a system for inserting fuel element magazines into the garret and transferring them to the storage system, and for withdrawing said magazines from said storage system and conveying them outside of the garret, said fuel-element insertion system being disposed within a tunnel provided with a lock-chamber which is located within the thickness of said reactor containment shielding, the orifice which puts said lock-chamber into communication with said garret being closeable by means of a door pivotally mounted on said reactor containment shielding and means associated with said door to move it within said garret.

2. Refuelling device as claimed in claim 1, wherein said door is integral with a toothed rack which is driven in a horizontal movement of translation by means of a pinion which is actuated from the exterior of the garret.

3. Refuelling device as claimed in claim 1, wherein said door has an elongated shape, the smallest diameter of which is shorter than the longest transverse dimension of the lock-chamber in order to permit of the introduction of said door through said lock-chamber, said lock-chamber being designed to terminate in a seating having the same shape as said door.

References Cited

UNITED STATES PATENTS

| | | | |
|---|---|---|---|
| 3,066,089 | 11/1962 | Davies | 176—30 |
| 3,194,742 | 7/1965 | Aubert et al. | 176—30 |
| 3,196,082 | 7/1965 | Lemesle et al. | 176—30 |
| 3,279,627 | 10/1966 | Aubert et al. | 176—30 |

L. DEWAYNE RUTLEDGE, *Primary Examiner.*